(12) United States Patent
Xue et al.

(10) Patent No.: US 11,916,633 B2
(45) Date of Patent: Feb. 27, 2024

(54) NON-CODEBOOK BASED PRECODING FOR SIDELINK COMMUNICATIONS

(71) Applicant: QUALCOMM Incorporated, San Diego, CA (US)

(72) Inventors: Yisheng Xue, San Diego, CA (US); Chih-Hao Liu, San Diego, CA (US); Jing Sun, San Diego, CA (US); Xiaoxia Zhang, San Diego, CA (US); Shuanshuan Wu, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 236 days.

(21) Appl. No.: 17/339,095

(22) Filed: Jun. 4, 2021

(65) Prior Publication Data

US 2022/0393735 A1 Dec. 8, 2022

(51) Int. Cl.
*H04W 4/00* (2018.01)
*H04B 7/0456* (2017.01)
*H04B 7/06* (2006.01)
*H04W 80/02* (2009.01)
*H04W 92/18* (2009.01)

(52) U.S. Cl.
CPC ......... *H04B 7/0626* (2013.01); *H04B 7/0456* (2013.01); *H04W 80/02* (2013.01); *H04W 92/18* (2013.01)

(58) Field of Classification Search
CPC .. H04B 7/0626; H04B 7/0456; H04B 7/0404; H04B 7/0695; H04W 80/02; H04W 92/18; H04W 28/04; H04W 72/04; H04W 72/042; H04W 88/08; H04L 5/0007
See application file for complete search history.

(56) References Cited

U.S. PATENT DOCUMENTS

| | | | | |
|---|---|---|---|---|
| 11,424,802 | B2 * | 8/2022 | Sarkis | H04W 72/20 |
| 11,616,551 | B2 * | 3/2023 | Großmann | H04B 7/0632 |
| | | | | 370/329 |
| 2015/0110210 | A1 * | 4/2015 | Yang | H04L 5/0048 |
| | | | | 375/267 |

(Continued)

FOREIGN PATENT DOCUMENTS

| | | | | |
|---|---|---|---|---|
| EP | 3780411 A1 | | 2/2021 | |
| EP | 4142382 A1 * | | 3/2023 | ........... H04W 24/08 |
| WO | WO-2020222443 A1 | | 11/2020 | |

OTHER PUBLICATIONS

International Search Report and Written Opinion—PCT/US2022/071435—ISA/EPO—dated Jul. 15, 2022.

*Primary Examiner* — Phuongchau Ba Nguyen
(74) *Attorney, Agent, or Firm* — Harrity & Harrity, LLP

(57) ABSTRACT

Various aspects of the present disclosure generally relate to wireless communication. In some aspects, a user equipment (UE) may transmit, to another UE, a sidelink channel state information reference signal (S-CSI-RS) and an indication associated with triggering a non-codebook based precoded S-CSI-RS. The UE may receive, from the other UE, the non-codebook based precoded S-CSI-RS. The UE may transmit, to the other UE, a non-codebook based channel state information (CSI) report medium access control (MAC) control element (MAC-CE) that includes an indication of one or more selected precoding beams based at least in part on the non-codebook based precoded S-CSI-RS. Numerous other aspects are described.

30 Claims, 9 Drawing Sheets

(56) References Cited

U.S. PATENT DOCUMENTS

| | | | |
|---|---|---|---|
| 2021/0050888 A1* | 2/2021 | Manolakos | H04L 5/0023 |
| 2021/0105055 A1* | 4/2021 | Chae | H04L 5/0026 |
| 2021/0136731 A1* | 5/2021 | Li | H04W 24/10 |
| 2022/0232549 A1* | 7/2022 | Yeo | H04L 5/0044 |
| 2022/0286255 A1* | 9/2022 | Guo | H04L 5/006 |
| 2022/0394722 A1* | 12/2022 | Hwang | H04W 72/542 |
| 2023/0041572 A1* | 2/2023 | Xue | H04W 72/0446 |

* cited by examiner

NON-CODEBOOK BASED PRECODING FOR SIDELINK COMMUNICATIONS

FIELD OF THE DISCLOSURE

Aspects of the present disclosure generally relate to wireless communication and to techniques and apparatuses for non-codebook based precoding for sidelink communications.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. NR, which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a user equipment (UE) for wireless communication includes a memory, and one or more processors, coupled to the memory, configured to: transmit, to another UE, a sidelink channel state information reference signal (S-CSI-RS) and an indication associated with triggering a non-codebook based precoded S-CSI-RS; receive, from the other UE, the non-codebook based precoded S-CSI-RS; and transmit, to the other UE, a non-codebook based channel state information (CSI) report medium access control (MAC) control element (MAC-CE) that includes an indication of one or more selected precoding beams based at least in part on the non-codebook based precoded S-CSI-RS.

In some aspects, a UE for wireless communication includes a memory, and one or more processors, coupled to the memory, configured to: receive, from another UE, an S-CSI-RS and an indication associated with triggering a non-codebook based precoded S-CSI-RS; transmit, to the other UE, the non-codebook based precoded S-CSI-RS, wherein the non-codebook based precoded S-CSI-RS is precoded based at least in part on the S-CSI-RS received from the other UE; and receive, from the other UE, a non-codebook based CSI report MAC-CE that includes an indication of one or more selected precoding beams based at least in part on the non-codebook based precoded S-CSI-RS.

In some aspects, a method of wireless communication performed by a UE includes transmitting, to another UE, an S-CSI-RS and an indication associated with triggering a non-codebook based precoded S-CSI-RS; receiving, from the other UE, the non-codebook based precoded S-CSI-RS; and transmitting, to the other UE, a non-codebook based CSI report MAC-CE that includes an indication of one or more selected precoding beams based at least in part on the non-codebook based precoded S-CSI-RS.

In some aspects, a method of wireless communication performed by a UE includes receiving, from another UE, an S-CSI-RS and an indication associated with triggering a non-codebook based precoded S-CSI-RS; transmitting, to the other UE, the non-codebook based precoded S-CSI-RS, wherein the non-codebook based precoded S-CSI-RS is precoded based at least in part on the S-CSI-RS received from the other UE; and receiving, from the other UE, a non-codebook based CSI report MAC-CE that includes an indication of one or more selected precoding beams based at least in part on the non-codebook based precoded S-CSI-RS.

In some aspects, a non-transitory computer-readable medium storing a set of instructions for wireless communication includes one or more instructions that, when executed by one or more processors of a UE, cause the UE to: transmit, to another UE, an S-CSI-RS and an indication associated with triggering a non-codebook based precoded S-CSI-RS; receive, from the other UE, the non-codebook based precoded S-CSI-RS; and transmit, to the other UE, a non-codebook based CSI report MAC-CE that includes an indication of one or more selected precoding beams based at least in part on the non-codebook based precoded S-CSI-RS.

In some aspects, a non-transitory computer-readable medium storing a set of instructions for wireless communication includes one or more instructions that, when executed by one or more processors of a UE, cause the UE to: receive, from another UE, an S-CSI-RS and an indication associated with triggering a non-codebook based precoded S-CSI-RS; transmit, to the other UE, the non-codebook based precoded S-CSI-RS, wherein the non-codebook based precoded S-CSI-RS is precoded based at least in part on the S-CSI-RS received from the other UE; and receive, from the other UE, a non-codebook based CSI report MAC-CE that includes an indication of one or more selected precoding beams based at least in part on the non-codebook based precoded S-CSI-RS.

In some aspects, an apparatus for wireless communication includes means for transmitting, to a UE, an S-CSI-RS and an indication associated with triggering a non-codebook based precoded S-CSI-RS; means for receiving, from the UE, the non-codebook based precoded S-CSI-RS; and means for transmitting, to the UE, a non-codebook based CSI report MAC-CE that includes an indication of one or more selected precoding beams based at least in part on the non-codebook based precoded S-CSI-RS.

In some aspects, an apparatus for wireless communication includes means for receiving, from a UE, an S-CSI-RS and an indication associated with triggering a non-codebook based precoded S-CSI-RS; means for transmitting, to the UE, the non-codebook based precoded S-CSI-RS, wherein the non-codebook based precoded S-CSI-RS is precoded based at least in part on the S-CSI-RS received from the UE; and means for receiving, from the UE, a non-codebook based CSI report MAC-CE that includes an indication of one or more selected precoding beams based at least in part on the non-codebook based precoded S-CSI-RS.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
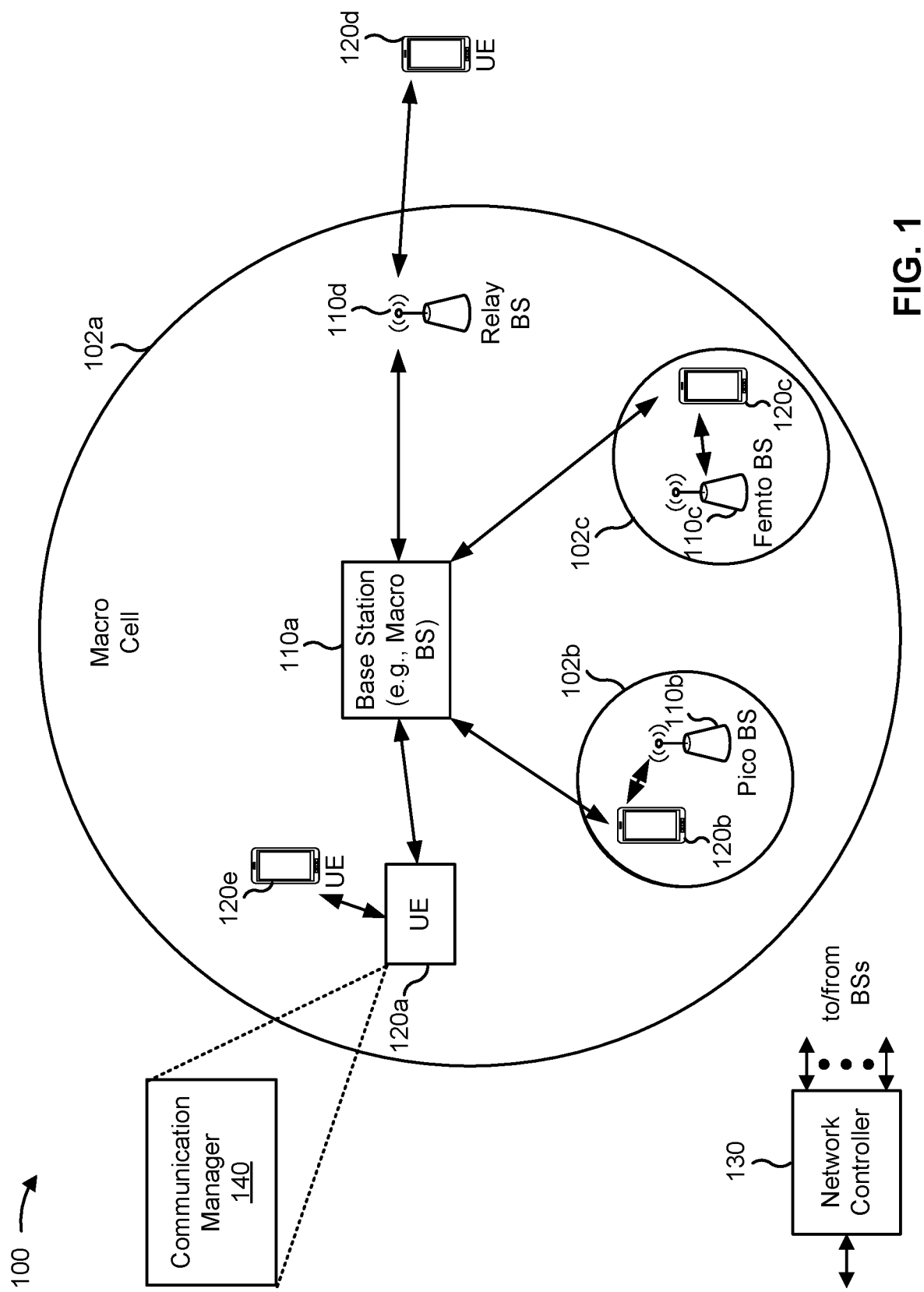
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110a, a BS 110b, a BS 110c, and a BS 110d), a user equipment (UE) 120 or multiple UEs 120 (shown as a UE 120a, a UE 120b, a UE 120c, a UE 120d, and a UE 120e), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110d (e.g., a relay base station) may communicate with the BS 110a (e.g., a macro base station) and the UE 120d in order to facilitate communication between the BS 110a and the UE 120d. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may transmit, to another UE, a sidelink channel state information reference signal (S-CSI-RS) and an indication associated with triggering a non-codebook based precoded S-CSI-RS; receive, from the other UE, the non-codebook based precoded S-CSI-RS; and transmit, to the other UE, a non-codebook based channel state information (CSI) report medium access control (MAC) control element (MAC-CE) that includes an indication of one or more selected precoding beams based at least in part on the non-codebook based precoded S-CSI-RS. Additionally, or alternatively, the communication manager 140 may perform one or more other operations described herein.

In some aspects, as described in more detail elsewhere herein, the communication manager 140 may receive, from another UE, an S-CSI-RS and an indication associated with triggering a non-codebook based precoded S-CSI-RS; transmit, to the other UE, the non-codebook based precoded S-CSI-RS, wherein the non-codebook based precoded S-CSI-RS is precoded based at least in part on the S-CSI-RS received from the other UE; and receive, from the other UE, a non-codebook based CSI report MAC-CE that includes an indication of one or more selected precoding beams based at least in part on the non-codebook based precoded S-CSI-RS. Additionally, or alternatively, the communication manager 140 may perform one or more other operations described herein.

As indicated above, FIG. 1 is provided as an example. Other examples may differ from what is described with regard to FIG. 1.

Figure 2:
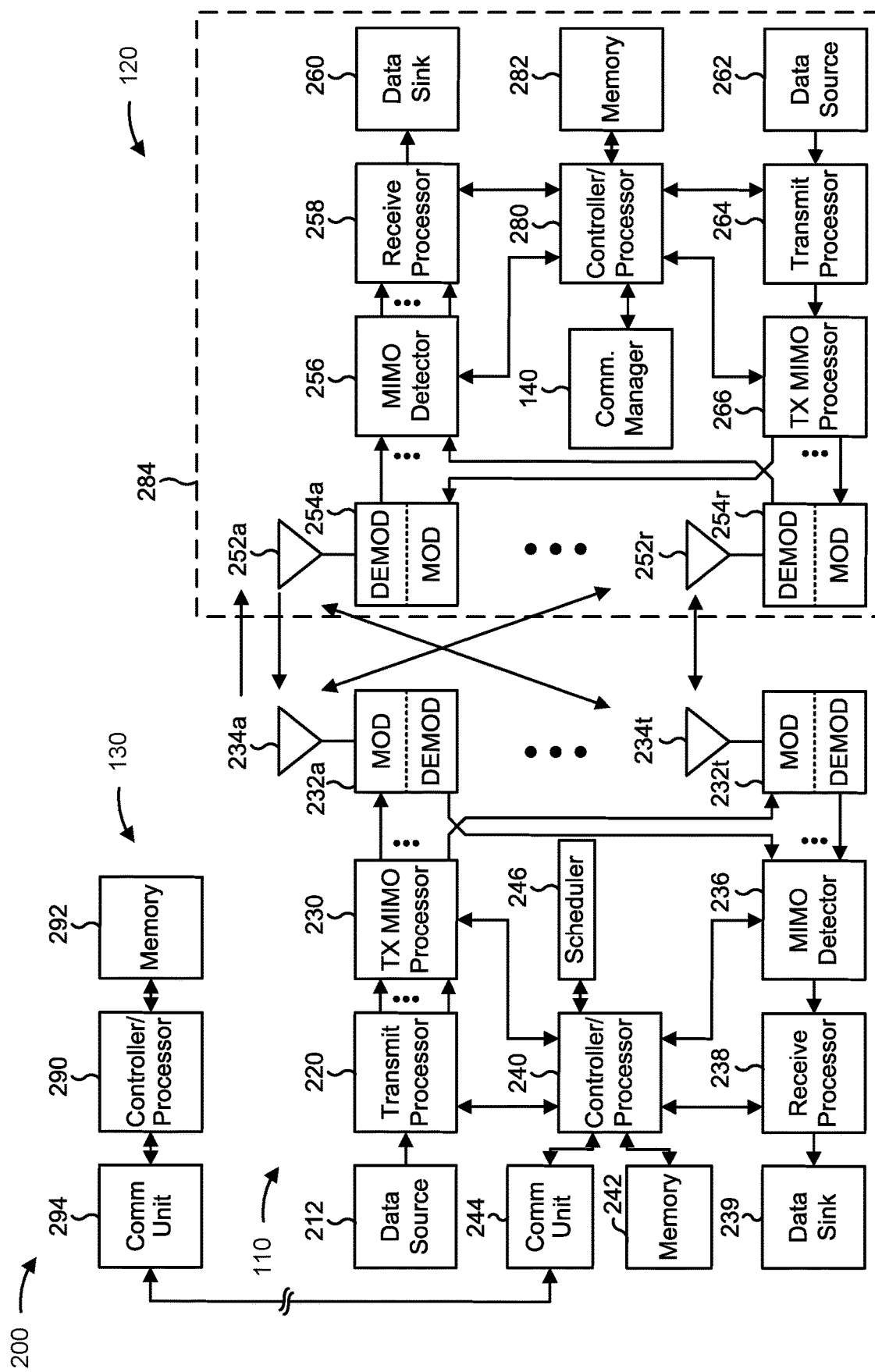
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The UE 120 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 6-8).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 6-8).

The controller/processor 240 of the base station 110, the controller/processor 280 of the UE 120, and/or any other component(s) of FIG. 2 may perform one or more techniques associated with non-codebook based precoding for sidelink communications, as described in more detail elsewhere herein. For example, the controller/processor 240 of the base station 110, the controller/processor 280 of the UE 120, and/or any other component(s) of FIG. 2 may perform or direct operations of, for example, process 700 of FIG. 7, process 800 of FIG. 8, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 700 of FIG. 7, process 800 of FIG. 8, and/or other processes as described herein. In some examples, executing instructions may include running the instructions, converting the instructions, compiling the instructions, and/or interpreting the instructions, among other examples.

In some aspects, the UE 120 includes means for transmitting, to another UE, an S-CSI-RS and an indication associated with triggering a non-codebook based precoded S-CSI-RS; means for receiving, from the other UE, the non-codebook based precoded S-CSI-RS; and/or means for transmitting, to the other UE, a non-codebook based CSI report MAC-CE that includes an indication of one or more selected precoding beams based at least in part on the non-codebook based precoded S-CSI-RS. The means for the UE 120 to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the UE 120 includes means for receiving, from another UE, an S-CSI-RS and an indication associated with triggering a non-codebook based precoded S-CSI-RS; means for transmitting, to the other UE, the non-codebook based precoded S-CSI-RS, wherein the non-codebook based precoded S-CSI-RS is precoded based at least in part on the S-CSI-RS received from the other UE; and/or means for receiving, from the other UE, a non-codebook based CSI report MAC-CE that includes an indication of one or more selected precoding beams based at least in part on the non-codebook based precoded S-CSI-RS. The means for the UE 120 to perform operations described herein may include, for example, one or more of communication manager 140, antenna 252, modem 254, MIMO detector 256, receive processor 258, transmit processor 264, TX MIMO processor 266, controller/processor 280, or memory 282.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3:
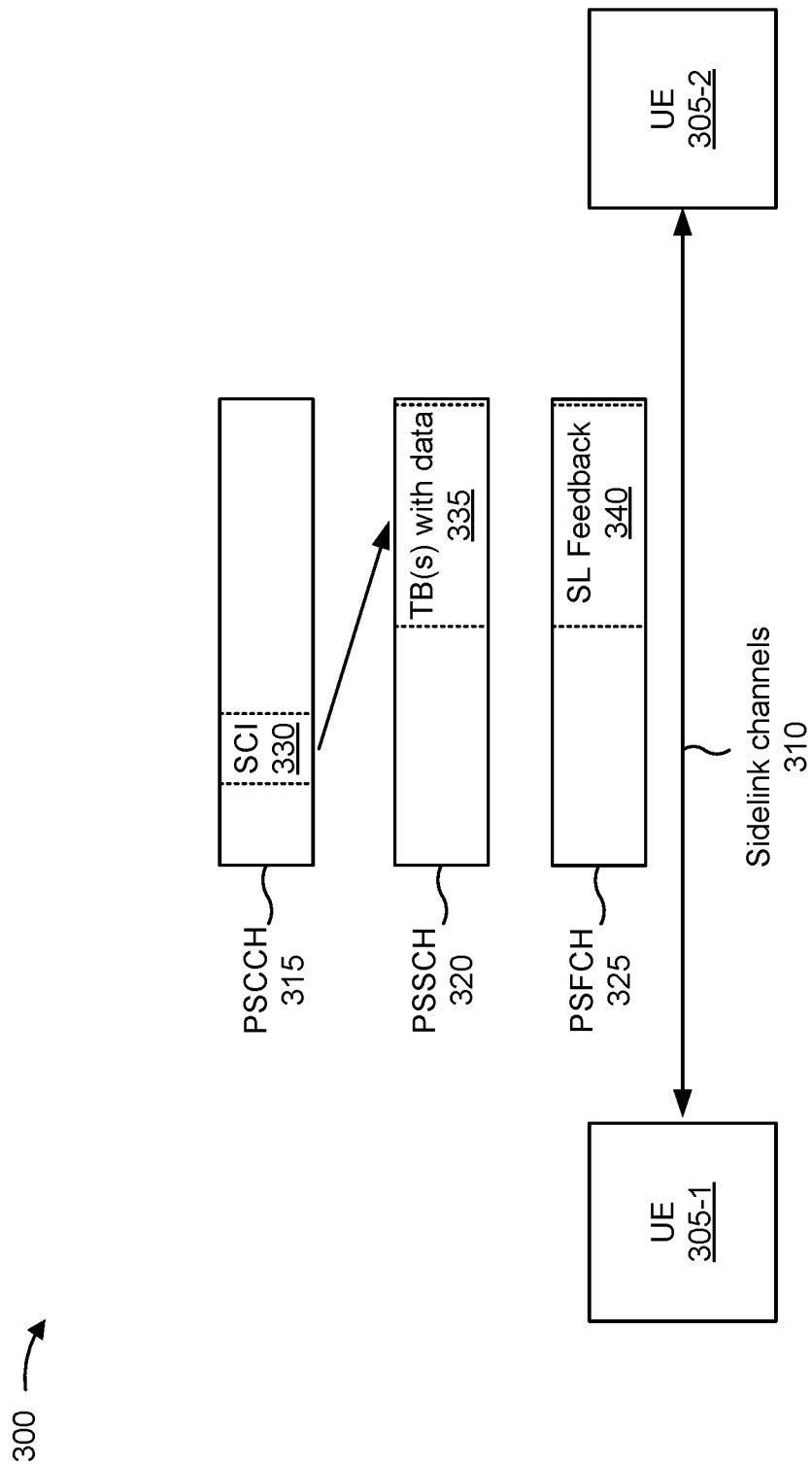
FIG. 3 is a diagram illustrating an example of sidelink communications, in accordance with the present disclosure.

FIG. 3 is a diagram illustrating an example 300 of sidelink communications, in accordance with the present disclosure.

As shown in FIG. 3, a first UE 305-1 may communicate with a second UE 305-2 (and one or more other UEs 305) via one or more sidelink channels 310. The UEs 305-1 and 305-2 may communicate using the one or more sidelink channels 310 for P2P communications, D2D communications, V2X communications (e.g., which may include V2V communications, V2I communications, and/or V2P communications) and/or mesh networking. In some aspects, the UEs 305 (e.g., UE 305-1 and/or UE 305-2) may correspond to one or more other UEs described elsewhere herein, such as UE 120. In some aspects, the one or more sidelink channels 310 may use a PC5 interface and/or may operate in a high frequency band (e.g., the 5.9 GHz band). Additionally, or alternatively, the UEs 305 may synchronize timing of transmission time intervals (TTIs) (e.g., frames, subframes, slots, or symbols) using global navigation satellite system (GNSS) timing.

As further shown in FIG. 3, the one or more sidelink channels 310 may include a physical sidelink control channel (PSCCH) 315, a physical sidelink shared channel (PSSCH) 320, and/or a physical sidelink feedback channel (PSFCH) 325. The PSCCH 315 may be used to communicate control information, similar to a physical downlink control channel (PDCCH) and/or a physical uplink control channel (PUCCH) used for cellular communications with a base station 110 via an access link or an access channel. The PSSCH 320 may be used to communicate data, similar to a physical downlink shared channel (PDSCH) and/or a physical uplink shared channel (PUSCH) used for cellular communications with a base station 110 via an access link or an access channel. For example, the PSCCH 315 may carry sidelink control information (SCI) 330, which may indicate various control information used for sidelink communications, such as one or more resources (e.g., time resources, frequency resources, and/or spatial resources) where a transport block (TB) 335 may be carried on the PSSCH 320. The TB 335 may include data. The PSFCH 325 may be used to communicate sidelink feedback 340, such as hybrid automatic repeat request (HARQ) feedback (e.g., acknowledgement or negative acknowledgement (ACK/NACK) information), transmit power control (TPC), and/or a scheduling request (SR).

Although shown on the PSCCH 315, in some aspects, the SCI 330 may include multiple communications in different stages, such as a first stage SCI (SCI-1) and a second stage SCI (SCI-2). The SCI-1 may be transmitted on the PSCCH 315. The SCI-2 may be transmitted on the PSSCH 320. The SCI-1 may include, for example, an indication of one or more resources (e.g., time resources, frequency resources, and/or spatial resources) on the PSSCH 320, information for decoding sidelink communications on the PSSCH, a quality of service (QoS) priority value, a resource reservation period, a PSSCH DMRS pattern, an SCI format for the SCI-2, a beta offset for the SCI-2, a quantity of PSSCH DMRS ports, and/or an MCS. The SCI-2 may include information associated with data transmissions on the PSSCH 320, such as a HARQ process ID, a new data indicator (NDI), a source identifier, a destination identifier, and/or a CSI report trigger.

In some aspects, the one or more sidelink channels 310 may use resource pools. For example, a scheduling assignment (e.g., included in SCI 330) may be transmitted in sub-channels using specific resource blocks (RBs) across time. In some aspects, data transmissions (e.g., on the PSSCH 320) associated with a scheduling assignment may occupy adjacent RBs in the same subframe as the scheduling assignment (e.g., using frequency division multiplexing). In some aspects, a scheduling assignment and associated data transmissions are not transmitted on adjacent RBs.

In some aspects, a UE 305 may operate using a sidelink transmission mode (e.g., mode 1) where the UE 305 receives a grant from a base station 110 for sidelink channel access. In some aspects, a UE 305 may operate using a transmission mode (e.g., mode 2) where resource selection and/or scheduling is performed by the UE 305 (e.g., rather than a base station 110). In some aspects, the UE 305 may perform resource selection and/or scheduling by sensing channel availability for transmissions. For example, the UE 305 may measure an RSSI parameter (e.g., a sidelink-RSSI (S-RSSI) parameter) associated with various sidelink channels, may measure an RSRP parameter (e.g., a PSSCH-RSRP parameter) associated with various sidelink channels, and/or may measure an RSRQ parameter (e.g., a PSSCH-RSRQ parameter) associated with various sidelink channels, and may select a channel for transmission of a sidelink communication based at least in part on the measurement(s).

Additionally, or alternatively, the UE 305 may perform resource selection and/or scheduling using SCI 330 received in the PSCCH 315, which may indicate occupied resources and/or channel parameters. Additionally, or alternatively, the UE 305 may perform resource selection and/or scheduling by determining a channel busy rate (CBR) associated with various sidelink channels, which may be used for rate control (e.g., by indicating a maximum number of resource blocks that the UE 305 can use for a particular set of subframes).

In the transmission mode (e.g., mode 2) where resource selection and/or scheduling is performed by a UE 305, the UE 305 may generate sidelink grants, and may transmit the grants in SCI 330. A sidelink grant may indicate, for example, one or more parameters (e.g., transmission parameters) to be used for an upcoming sidelink transmission, such as one or more resource blocks to be used for the upcoming sidelink transmission on the PSSCH 320 (e.g., for TBs 335), one or more subframes to be used for the upcoming sidelink transmission, and/or an MCS to be used for the upcoming sidelink transmission. In some aspects, a UE 305 may generate a sidelink grant that indicates one or more parameters for semi-persistent scheduling (SPS), such as a periodicity of a sidelink transmission. Additionally, or alternatively, the UE 305 may generate a sidelink grant for event-driven scheduling, such as for an on-demand sidelink message.

As indicated above, FIG. 3 is provided as an example. Other examples may differ from what is described with respect to FIG. 3.

Figure 4:
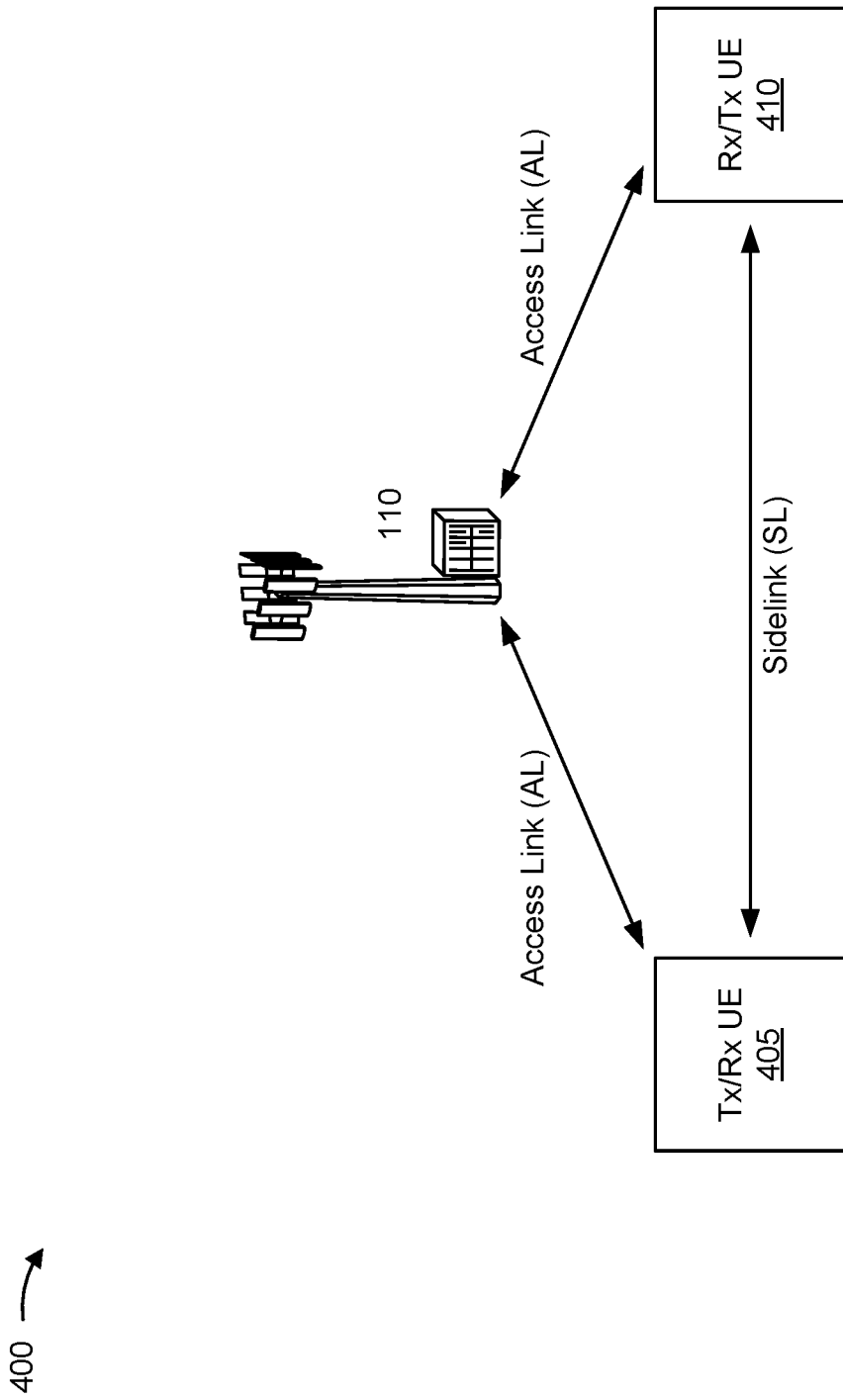
FIG. 4 is a diagram illustrating an example of sidelink communications and access link communications, in accordance with the present disclosure.

FIG. 4 is a diagram illustrating an example 400 of sidelink communications and access link communications, in accordance with the present disclosure.

As shown in FIG. 4, a transmitter (Tx)/receiver (Rx) UE 405 and an Rx/Tx UE 410 may communicate with one another via a sidelink, as described above in connection with FIG. 3. As further shown, in some sidelink modes, a base station 110 may communicate with the Tx/Rx UE 405 via a first access link. Additionally, or alternatively, in some sidelink modes, the base station 110 may communicate with the Rx/Tx UE 410 via a second access link. The Tx/Rx UE 405 and/or the Rx/Tx UE 410 may correspond to one or more UEs described elsewhere herein, such as the UE 120 of FIG. 1. Thus, a direct link between UEs 120 (e.g., via a PC5 interface) may be referred to as a sidelink, and a direct link between a base station 110 and a UE 120 (e.g., via a Uu interface) may be referred to as an access link. Sidelink communications may be transmitted via the sidelink, and access link communications may be transmitted via the access link. An access link communication may be either a downlink communication (from a base station 110 to a UE 120) or an uplink communication (from a UE 120 to a base station 110).

As indicated above, FIG. 4 is provided as an example. Other examples may differ from what is described with respect to FIG. 4.

Figure 5:
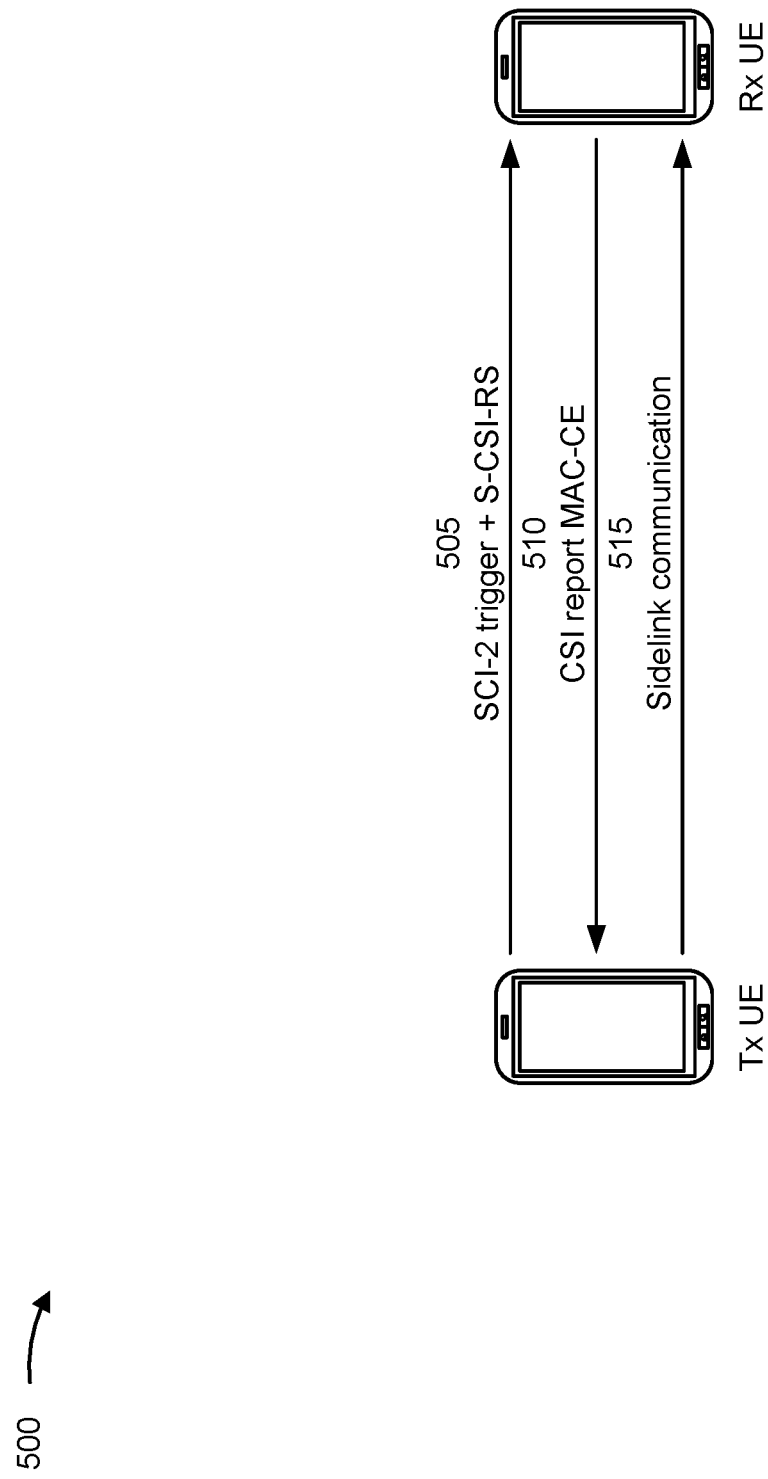
FIG. 5 is a diagram illustrating an example of sidelink channel state information (S-CSI) acquisition, in accordance with the present disclosure

FIG. 5 is a diagram illustrating an example 500 of sidelink CSI (S-CSI) acquisition, in accordance with the present disclosure. As shown in FIG. 5, S-CSI acquisition may be used to perform an adaptive modulation and coding (AMC) scheme to support sidelink transmission (e.g., rank 2 transmission from a Tx UE to an Rx UE.

As shown in FIG. 5, and by reference number 505, the Tx UE may transmit, to the Rx UE, a CSI report trigger and an S-CSI-RS. For example, the Tx UE may include a one bit CSI report trigger in SCI-2 to request CSI feedback (e.g., a CSI report) with respect to the embedded S-CSI-RS. As shown by reference number 510, based at least in part on receiving the CSI report trigger, the Rx UE may transmit, to the Tx UE, a CSI report MAC-CE. For example, the Rx UE may transmit the CSI report MAC-CE to the Tx UE over the PSSCH. The CSI report MAC-CE may include a one bit rank indicator (RI) and a four bit CQI. To determine the CQI, the Rx UE may measure the sidelink channel from the Tx UE using the S-CSI-RS. The CQI may indicate a highest MCS that can be supported by the sidelink channel measured by the Rx UE. Based at least in part on channel measurements of S-CSI-RSs transmitted from one or more antenna ports of the Tx UE, the Rx UE may determine the RI that indicates the rank of the measured sidelink channel (e.g., a number of streams that can be supported by the channel). The sidelink CSI acquisition shown in example 500 involves transmission of the CSI report trigger and the S-CSI-RS by the Tx UE and transmission of the CSI report MAC-CE by the Rx UE. The sidelink CSI acquisition shown in example 500 may be referred to as "two-step sidelink CSI acquisition."

As shown by reference number 515, the Tx UE may transmit, to the Rx UE, a sidelink communication based at least in part on the CSI report MAC-CE received from the Rx UE. For example, the Tx UE may select and/or adjust the MCS for transmitting the sidelink communication based at least in part on the CQI and RI indicated in the CSI report MAC-CE.

As indicated above, FIG. 5 is provided as an example. Other examples may differ from what is described with respect to FIG. 5.

As sidelink use cases evolve in vertical domains other than the V2X domain, not every vertical domain may have access to the sub-6 GHz licensed band for sidelink communications. In addition, vertical domains that do have access to the sub-6 GHz licensed band may seek opportunities in unlicensed bands. There are approximately 1.8 GHz available in the 5 GHz/6 GHz unlicensed band and approximately 7 GHz available in the 60 GHz unlicensed band. Such wider bandwidths may create significantly different deployment use cases for sidelink communications. For example, enhanced mobile broadband (eMBB)-like traffic may be dominant in some of such sidelink use cases. In such cases, the arrivals of dynamic traffic bursts may create a hot spot which may benefit from mechanisms for prompt cleaning of a data buffer of a UE to avoid congestion. In some cases, sidelink UEs may have more antennas than V2X sidelink UEs, and/or network topology may be less dynamic (e.g., more stationary) than in V2X. In such cases, it may be beneficial to apply advanced transmission schemes and efficient AMC schemes used for access link communications via the Uu interface to sidelink communications via the PC5 interface.

One AMC scheme used for uplink communications via the Uu interface is non-codebook based precoding. Non-codebook precoding is based on an assumption of channel reciprocity. In this case, a UE may acquire detailed knowledge of an uplink channel based on a downlink channel measurement. This enables the UE to select a suitable uplink precoder (e.g., calculate a precoding matrix for an uplink communication) based on the measurement of the downlink channel. This may increase spectral efficiency, as compared to codebook-based precoding, in which the precoder is selected from a codebook based on statistical knowledge of a channel. In some cases, channel reciprocity may hold for time division duplexing (TDD) based sidelink communications. However, there is no mechanism for non-codebook based precoding for sidelink communications. As a result, increases in spectral efficiency due to non-codebook based precoding may not be achieved for sidelink communications.

Some techniques and apparatuses described herein enable non-codebook based precoding for sidelink communications. In some aspects, a first UE may transmit, to a second UE, an S-CSI-RS and an indication associated with triggering a non-codebook based precoded S-CSI-RS. Based at least in part on receiving the S-CSI-RS and the indication, the second UE may transmit, to the first UE, the non-codebook based precoded S-CSI-RS, which may be precoded based at least in part on the S-CSI-RS received from the first UE. The first UE may transmit, to the second UE, a non-codebook based CSI report MAC-CE that includes an indication of one or more selected precoding beams based at least in part on the non-codebook based precoded S-CSI-RS. The second UE may transmit a sidelink communication to the first UE using the one or more selected precoding beams. As a result, spectral efficiency for sidelink communications from the second UE to the first UE may be improved, as compared to transmitting such sidelink communications without using non-codebook based precoding.

Figure 6:
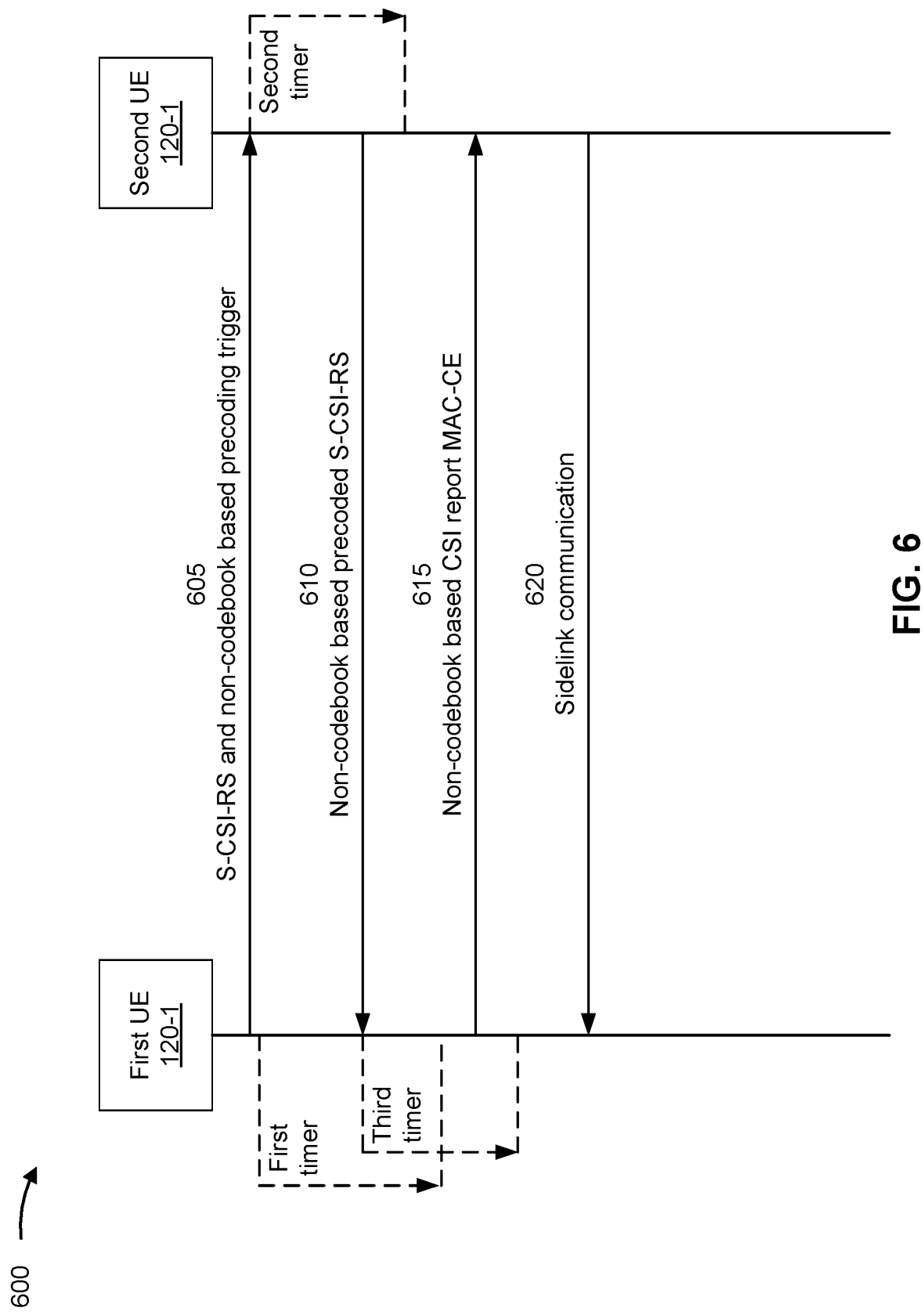
FIG. 6 is a diagram illustrating an example associated with non-codebook based precoding for sidelink communications, in accordance with the present disclosure.

FIG. 6 is a diagram illustrating an example 600 associated with non-codebook based precoding for sidelink communications, in accordance with the present disclosure. As shown in FIG. 6, example 600 includes communication between a first UE 120-1 and a second UE 120-2. In some aspects, the first UE 120-1 and the second UE 120-2 may be included in a wireless network, such as wireless network 100. The first UE 120-1 and the second UE 120-2 may communicate via one or more sidelink channels as described elsewhere herein, such as the sidelink communications described with respect to the UEs 305-1 and 305-2. In some aspects, the first UE 120-1 may be an Rx UE, and the second UE 120-2 may be a Tx UE. In some aspects, the first UE 120-1 may be a Tx UE, and the second UE 120-2 may be an Rx UE.

As shown in FIG. 6, and by reference number 605, the first UE 120-1 may transmit, to the second UE 120-2, an S-CSI-RS and a non-codebook based precoding trigger. In some aspects, the first UE 120-1 may transmit the S-CSI-RS and the non-codebook based precoding trigger to initiate non-codebook based reception of a sidelink communication to be transmitted from the second UE 120-2. In some aspects, the UE may transmit the S-CSI-RS and the non-codebook based precoding trigger based at least in part on receiving, from the second UE 120-2, a control signaling request (e.g., in SCI) to transmit the S-CSI-RS and the non-codebook based precoding trigger. For example, the control signaling request may be an indication included in a scheduling request or other SCI transmission from the second UE 120-2 to the first UE 120-1. In some aspects, the first UE 120-1 may transmit the S-CSI-RS and the non-codebook based precoding trigger based at least in part on a determination, by the first UE 120-1, that a condition associated with triggering non-codebook based precoding sidelink transmissions from the second UE 120-2 has been detected.

The non-codebook based precoding trigger may be an indication associated with triggering a non-codebook based precoded S-CSI-RS. In some aspects, the indication (e.g., the non-codebook based precoding trigger) may be included in SCI-2 transmitted from the first UE 120-1 to the second UE 120-2. In some aspects, the non-codebook based precoding trigger may be an indication included, in SCI-2, in a bit associated with triggering the non-codebook based precoded S-CSI-RS. For example, the SCI-2 may include a designated bit for triggering the non-codebook based precoded S-CSI-RS. In this case, the SCI-2 may include the designated bit for the non-codebook based precoding trigger, and the SCI-2 may also include a another designated bit for a CSI report trigger (e.g., for triggering a CSI report, as described above in connection with FIG. 5).

In some aspects, the non-codebook based precoding trigger may be included, in the SCI-2, in a bit associated with a CSI request (e.g., a "CSI request" bit) in a time interval during which the bit associated with the CSI request is used to trigger the non-codebook based precoded S-CSI-RS. For example, in some aspects, one or more MAC-CE and/or PC5-radio resource control (RRC) hand shaking messages between the first UE 120-1 and the second UE 120-2 may indicate that the non-codebook based precoding is going to be performed within an upcoming time duration. In this case, the first UE 120-1 may use the CSI request bit (e.g., the bit associated with the CSI report trigger) in the SCI-2 to indicate the non-codebook based precoding trigger (instead of the CSI report trigger) during the time interval after the MAC-CE and/or PC5-RRC hand shaking. In some aspects, one or more MAC-CE and/or PC5-RRC hand shaking messages between the first UE 120-1 and the second UE 120-2 may indicate periodic time intervals during which the CSI request bit can be used to indicate the non-codebook based precoding trigger. In this case, the first UE 120-1 may use the CSI request bit (e.g., the bit associated with the CSI report trigger) in the SCI-2 to indicate the non-codebook based precoding trigger (instead of the CSI report trigger) during one of the periodic time intervals.

The S-CSI-RS may be a non-precoded S-CSI-RS. In some aspects, the S-CSI-RS may include one or multiple transmissions of the S-CSI-RS. In some cases, multiple transmissions of the S-CSI-RS may be referred to as multiple S-CSI-RSs. In some aspects, the first UE 120-1 may transmit S-CSI-RSs associated with different antenna ports (e.g., different Tx antennas) of the first UE 120-1. In some aspects, such as in a case in which the first UE 120-1 has more Rx RF chains than Tx RF chains, the first UE 120-1 may utilize antenna switching to transmit the S-CSI-RSs. For example, the first UE 120-1 may transmit S-CSI-RSs from different sets of Tx antennas in respective PSSCH communications. In some aspects, the indication associated with triggering the non-codebook based precoded S-CSI-RS may also include an indication of whether antenna switching is used to transmit the S-CSI-RSs. For example, the first UE 120-1 may indicate, in SCI-2, whether the S-CSI-RS(s) is transmitted without antenna switching or with antenna switching.

As shown in FIG. 6, in some aspects, the first UE 120-1 may activate a first timer in connection with transmitting the non-codebook based precoding trigger. The first timer may be a timer for the first UE 120-1 to receive a precoded S-CSI-RS from the second UE 120-2. The first timer may run until the non-codebook based precoded S-CSI-RS is received or until a duration associated with the timer expires, whichever occurs first. In some aspects, the first timer may be activated and maintained by a MAC entity of the first UE 120-1. In some aspects, the duration of the first timer may be configured via a layer three (L3) configuration. For example, an L3 (e.g., RRC) configuration for the first timer may be named "sl-CSI-ReceivePCSIRS," and the duration may be indicated by a parameter named "sl-LatencyBound-CSI-ReceivePCSIRS." When the first timer is running, the first UE 120-1 may attempt to receive the precoded S-CSI-RS from the second UE 120-2. The first timer may stop when the first UE 120-1 receives the precoded S-CSI-RS from the second UE 120-2. In a case in which the duration of the first timer expires prior to the first UE 120-1 receiving the precoded S-CSI-RS, the first UE 120-1 may terminate the non-codebook based precoding procedure in connection with the duration of the first timer expiring. In some aspects, in a case in which the first UE 120-1 uses antenna switching to transmit S-CSI-RSs from different sets of Tx antennas in respective PSSCH communications, the first UE 120-1 may activate the first timer in connection with transmitting a last PSSCH communication including one of the S-CSI-RSs.

In some aspects, the first UE 120-1 may activate a prohibit timer in connection with transmitting the non-codebook based precoding trigger. The prohibit timer may prevent the first UE 120-1 from transmitting another non-codebook based precoding trigger for a duration associated with the prohibit timer. In some aspects, the duration (e.g., a latency bound) associated with the prohibit timer may be configured for the first UE 120-1 in an L3 (e.g., RRC) configuration. While the prohibit timer is running, the first UE 120-1 may be prevented from transmitting another non-codebook based precoding trigger to the second UE 120-2 until the prohibit timer expires.

As further shown in FIG. 6, and by reference number 610, the second UE 120-2 may transmit, to the first UE 120-1, a non-codebook based precoded S-CSI-RS. The second UE 120-2 may receive the S-CSI-RS and the non-codebook based precoding trigger from the first UE 120-1, and the second UE 120-2 may transmit the non-codebook based precoded S-CSI-RS to the first UE 120-1 based at least in part on receiving the non-codebook based precoding trigger (e.g., the indication associated with triggering the non-codebook based precoded S-CSI-RS) from the first UE 120-1. The second UE 120-2 may precode the precoded S-CSI-RS based at least in part on the S-CSI-RS received from the first UE 120-1. For example, the second UE 120-2 may precode the precoded S-CSI-RS based at least in part on channel measurements performed using the S-CSI-RS received from the first UE 120-1.

The second UE 120-2 may perform channel estimation based at least in part on the S-CSI-RS received from the first UE 120-1 to obtain a channel estimate. For example, the second UE 120-2 may perform channel measurements using multiple S-CSI-RS transmissions from different Tx antennas of the first UE 120-1 to estimate a channel matrix (e.g., a MIMO channel matrix) based at least in part on the S-CSI-RS transmitted by the first UE 120-1. In some aspects, the second UE 120-2 may also perform an interference estimate based at least in part on the S-CSI-RS transmitted from the first UE 120-1. The second UE 120-2 may calculate one or more precoders based at least in part on the channel estimate. In some aspects, the second UE 120-2 may calculate a best precoding matrix based at least in part on the channel estimate assuming channel reciprocity for sidelink communications received from the first UE 120-1 and sidelink communications transmitted to the first UE 120-1. For example, the second UE 120-2 may calculate a precoding matrix using singular value decomposition (SVD) of the channel matrix. In some aspects, the second UE 120-2 may calculate the precoders (e.g., the precoding matrix) based at least in part on the channel estimate (e.g., the channel matrix) and the interference measurement.

The second UE 120-2 may precode an S-CSI-RS using the one or more precoders (e.g., the precoding matrix), resulting in the precoded S-CSI-RS, and the second UE 120-2 may transmit the precoded S-CSI-RS to the first UE 120-1. The precoded S-CSI-RS may include multiple precoded S-CSI-RS transmissions transmitted using different beams. In this case, the S-CSI-RS transmission on each beam is precoded using a respective precoder (e.g., in the precoding matrix), and the beams may be referred to as "precoding beams."

In some aspects, the second UE 120-2 may transmit the non-codebook based precoded S-CSI-RS without data in a buffer of the second UE 120-2. The second UE 120-2 may be permitted to transmit the non-codebook based precoded S-CSI-RS in connection with receiving the non-codebook based precoding trigger, even in the absence of data in the buffer of the second UE 120-2. For example, in a case in which the second UE 120-2 is operating in mode 1, the second UE 120-2 may transmit a scheduling request to a base station (e.g., base station 110) to request a grant for sidelink resources to transmit the precoded S-CSI-RS to the first UE 120-1, without having data in the buffer of the second UE 120-2. In a case in which the second UE 120-2 is operating in mode 2, the second UE 120-2 may trigger sensing for transmitting the precoded S-CSI-RS, without having data in the buffer of the second UE 120-2.

As shown in FIG. 6, in some aspects, the second UE 120-2 may activate a second timer in connection with receiving the non-codebook based precoding trigger (e.g., the indication associated with triggering the non-codebook based precoded S-CSI-RS) from the first UE 120-1. The second timer may be a timer associated with the second UE 120-2 sending the precoded S-CSI-RS to the first UE 120-1. The second timer may run until the non-codebook based precoded S-CSI-RS is transmitted or a until duration associated with the second timer expires. In some aspects, the second timer may be activated and maintained by a MAC entity of the second UE 120-2. In some aspects, the duration of the second timer may be configured via an L3 configuration. In some aspects, the second timer may be a dedicated timer configured for sending the non-codebook based precoded S-CSI-RS. For example, an L3 (e.g., RRC) configuration for the second timer may be named "sl-CSI-SendPCSIRS," and the duration may be indicated by a parameter named "sl-Latency-Bound-CSI-SendPCSIRS." In some aspects, the second UE 120-2 may be configured to use an existing timer associated with sending a CSI report (e.g., sl-CSI-ReportTimer) for the second timer (which is activated based at least in part on receiving the non-codebook based precoding trigger).

In some aspects, the second UE 120-2 may transmit the non-codebook based precoded S-CSI-RS before the duration associated with the second timer expires. In a case in which the second UE 120-2 is operating in mode 1, while the second timer is running, the second UE 120-2 may transmit a scheduling request for a grant of sidelink resources for transmitting the non-codebook based precoded S-CSI-RS. In a case in which the second UE 120-2 is operating in mode 2, while the second timer is running, the second UE 120-2 may trigger sensing for transmitting the non-codebook based precoded S-CSI-RS. In a case in which the duration of the second timer expires prior to the second UE 120-2 transmitting the precoded S-CSI-RS, the second UE 120-2 may terminate the non-codebook based precoding procedure in connection with the duration of the second timer expiring. In some aspects, in a case in which the first UE 120-1 uses antenna switching to transmit S-CSI-RSs from different sets of Tx antennas in respective PSSCH communications, the second UE 120-1 may activate the second timer in connection with receiving a last PSSCH communication including one of the S-CSI-RSs (e.g., based at least in part on an indication of antenna switching received from the first UE 120-1).

As further shown in FIG. 6, and by reference number 615, the first UE 120-1 may transmit a non-codebook based CSI report MAC-CE to the second UE 120-2. The first UE 120-1 may receive the non-codebook based precoded S-CSI-RS transmitted by the second UE 120-2, and the first UE 120-1 may transmit the non-codebook based CSI report MAC-CE to the second UE 120-2 based at least in part on receiving the non-codebook based precoded S-CSI-RS from the second UE 120-2. In some aspects, the non-codebook based CSI report MAC-CE may include an indication of one or more selected precoding beams based at least in part on the non-codebook based precoded S-CSI-RS.

In some aspects, the first UE 120-1 may receive the non-codebook based precoded S-CSI-RS before the duration associated with the first timer expires. In this case, the first UE 120-1 may transmit the non-codebook based CSI report MAC-CE to the second UE 120-2 based at least in part on a determination that the non-codebook based precoded S-CSI-RS is received before the duration associated with the first timer expires.

Based at least in part on receiving the non-codebook based precoded S-CSI-RS, the first UE 120-1 may perform channel measurements on the precoded S-CSI-RS transmissions on the different precoding beams. The first UE 120-1 may select one or more precoding beams based at least in part on the channel measurements. In some aspects, the first UE 120-1 may select one or more preferred precoding beams. In some aspects, the first UE 120-1 may select a preferred order of the precoding beams, or a preferred order for a subset of selected precoding beams, based at least in part on the channel measurements. In some aspects, the first UE 120-1 may also perform interference measurements on the precoded S-CSI-RS transmissions, and the first UE 120-1 may select one or more precoding beams and/or a preferred order for the precoding beams based at least in part on the channel measurements and the interference measurements. The first UE 120-1 may also determine an RI and CQI based at least in part on the precoded S-CSI-RS.

In some aspects, the non-codebook based CSI report MAC-CE may include the RI, the CQI, and an indication of the selected one or more precoding beams. In some aspects, the indication of the selected one or more precoding beams may indicate one or more preferred precoding beams selected by the first UE 120-1. In some aspects, the indication of the selected one or more precoding beams may indicate a preferred order for the precoding beams or a preferred order for a subset of precoding beams selected by the first UE 120-1. The precoding beams may correspond to respective precoders determined by the second UE 120-2. The precoders may be associated with respective precoder indexes. In some aspects, the non-codebook based CSI report MAC-CE may indicate the selected precoding beams (and/or the preferred order for the selected precoding beams) using the precoder indexes for the one or more precoders associated with the one or more selected precoding beams.

In some aspects, the first UE 120-1 may transmit the non-codebook based CSI report MAC-CE without data in a buffer of the first UE 120-1. The first UE 120-1 may be permitted to transmit the non-codebook based CSI report MAC-CE in connection with receiving the non-codebook based precoded S-CSI-RS, even in the absence of data in the buffer of the first UE 120-1. For example, in a case in which the first UE 120-1 is operating in mode 1, the first UE 120-1 may transmit a scheduling request to a base station (e.g., base station 110) to request a grant for sidelink resources to transmit the non-codebook based CSI report MAC-CE to the second UE 120-2, without having data in the buffer of the first UE 120-1. In a case in which the first UE 120-1 is operating in mode 2, the first UE 120-1 may trigger sensing for transmitting the non-codebook based CSI report MAC-CE, without having data in the buffer of the first UE 120-1.

As shown in FIG. 6, in some aspects, the first UE 120-1 may activate a third timer in connection with receiving the non-codebook based precoded S-CSI-RS. The third timer may be a timer for sending the non-codebook based CSI report MAC-CE to the second UE 120-2. The third timer may run until the non-codebook based CSI report MAC-CE is transmitted or a duration associated with the third timer expires, whichever occurs first. In some aspects, the third timer may be activated and maintained by the MAC entity of the first UE 120-1. In some aspects, the duration of the first timer may be configured via an L3 configuration. In some aspects, the third timer may be a dedicated timer configured for sending the non-codebook based CSI report MAC-CE. For example, an L3 (e.g., RRC) configuration for the third timer may be named "sl-CSI-ReportTimerNon-CodebookBased," and the duration may be indicated by a parameter named "sl-LatencyBound-CSI-ReportTimerNon-CodebookBased." In some aspects, the first UE 120-1 may be configured to use an existing timer associated with sending a CSI report (e.g., sl-CSI-ReportTimer) for the third timer (which is activated based at least in part on receiving the non-codebook based precoded S-CSI-RS).

In some aspects, the first UE 120-1 may transmit the non-codebook based CSI report MAC-CE before the duration associated with the third timer expires. In a case in which the first UE 120-1 is operating in mode 1, while the third timer is running, the first UE 120-1 may transmit a scheduling request for a grant of sidelink resources for transmitting the non-codebook based CSI report MAC-CE. In a case in which the first UE 120-1 is operating in mode 2, while the third timer is running, the first UE 120-1 may trigger sensing for transmitting the non-codebook based CSI report MAC-CE. In a case in which the duration of the third timer expires prior to the first UE 120-1 transmitting the non-codebook based CSI report MAC-CE, the first UE 120-1 may terminate the non-codebook based precoding procedure in connection with the duration of the third timer expiring.

As further shown in FIG. 6, and by reference number 620, the second UE 120-2 may transmit, to the first UE 120-1, a sidelink communication using at least one of the one or more selected precoding beams indicated in the non-codebook based CSI report MAC-CE received from the first UE 120-1. The second UE 120-2 may precode the sidelink communication using one or more precoders that are associated with the one or more selected precoding beams. For example, the sidelink communication may include one or more PSCCH communications (e.g., including SCI) and/or one or more PSSCH communications. In some aspects, the second UE 120-2 may include in the SCI the index or indexes of the one or more precoders used for transmitting the sidelink communication to the first UE 120-1. In some aspects, the second UE 120-2 may be configured to only use one or more precoders among precoders indicated (e.g., using respective precoder indexes) in the non-codebook based CSI report MAC-CE. In some aspects, the second UE 120-2 may be constrained to used only precoders among the precoders indicated (e.g., using the respective precoder indexes) in the non-codebook based CSI report MAC-CE for a certain time interval after receiving the non-codebook based CSI report MAC-CE.

As described above in connection with FIG. 6, the first UE 120-1 may transmit, to the second UE 120-2, an S-CSI-RS and an indication associated with triggering a non-codebook based precoded S-CSI-RS. Based at least in part on receiving the S-CSI-RS and the indication, the second UE 120-2 may transmit, to the first UE 120-1, the non-codebook based precoded S-CSI-RS, which may be precoded based at least in part on the S-CSI-RS received from the first UE 120-1. The first UE 120-1 may transmit, to the second UE 120-2, a non-codebook based CSI report MAC-CE that includes an indication of one or more selected precoding beams based at least in part on the non-codebook based precoded S-CSI-RS. The second UE 120-2 may transmit a sidelink communication to the first UE using the one or more selected precoding beams. As a result, spectral efficiency for sidelink communications from the second UE 120-2 to the first UE 120-1 may be improved, as compared to transmitting such sidelink communications without using non-codebook based precoding.

As indicated above, FIG. 6 is provided as an example. Other examples may differ from what is described with respect to FIG. 6.

Figure 7:
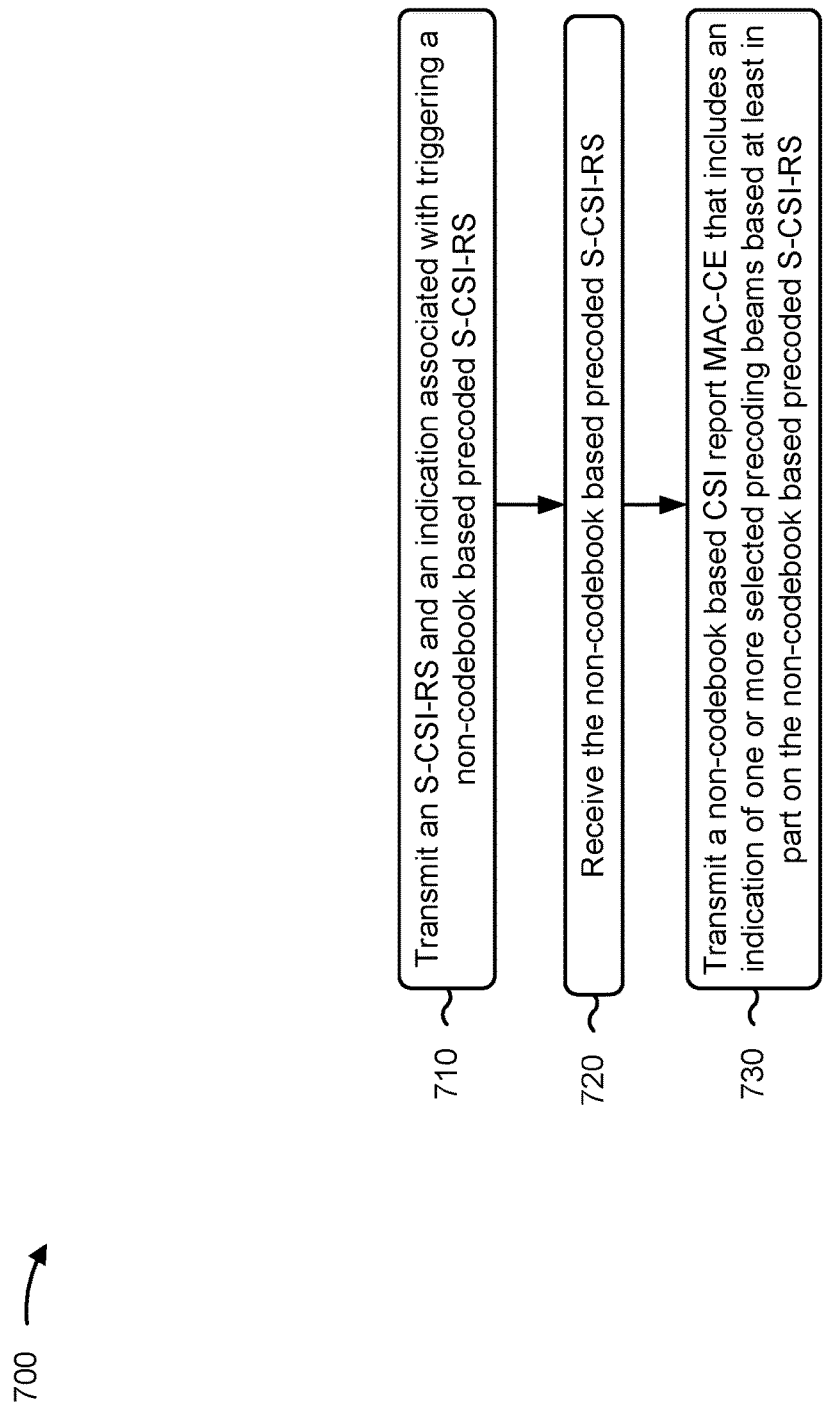
FIGS. 7-8 are diagrams illustrating example processes associated with non-codebook based precoding for sidelink communications, in accordance with the present disclosure.

FIG. 7 is a diagram illustrating an example process 700 performed, for example, by a UE, in accordance with the present disclosure. Example process 700 is an example where the UE (e.g., UE 120) performs operations associated with non-codebook based precoding for sidelink communications.

As shown in FIG. 7, in some aspects, process 700 may include transmitting, to another UE, an S-CSI-RS and an indication associated with triggering a non-codebook based precoded S-CSI-RS (block 710). For example, the UE (e.g., using communication manager 140 and/or transmission component 904, depicted in FIG. 9) may transmit, to another UE, an S-CSI-RS and an indication associated with triggering a non-codebook based precoded S-CSI-RS, as described above.

As further shown in FIG. 7, in some aspects, process 700 may include receiving, from the other UE, the non-codebook based precoded S-CSI-RS (block 720). For example, the UE (e.g., using communication manager 140 and/or reception component 902, depicted in FIG. 9) may receive, from the other UE, the non-codebook based precoded S-CSI-RS, as described above.

As further shown in FIG. 7, in some aspects, process 700 may include transmitting, to the other UE, a non-codebook based CSI report MAC-CE that includes an indication of one or more selected precoding beams based at least in part on the non-codebook based precoded S-CSI-RS (block 730). For example, the UE (e.g., using communication manager 140 and/or transmission component 904, depicted in FIG. 9) may transmit, to the other UE, a non-codebook based CSI report MAC-CE that includes an indication of one or more selected precoding beams based at least in part on the non-codebook based precoded S-CSI-RS, as described above.

Process 700 may include additional aspects, such as any single aspect or any combination of aspects described below and/or in connection with one or more other processes described elsewhere herein.

In a first aspect, process 700 includes receiving, from the other UE, a sidelink communication transmitted using at least one of the one or more selected precoding beams.

In a second aspect, alone or in combination with the first aspect, the indication is included in stage two sidelink control information.

In a third aspect, alone or in combination with one or more of the first and second aspects, the indication is included, in the stage two sidelink control information, in a bit associated with triggering the non-codebook based precoded S-CSI-RS.

In a fourth aspect, alone or in combination with one or more of the first through third aspects, the indication is included, in the stage two sidelink control information, in a bit associated with a CSI request in a time interval during which the bit associated with the CSI request is used to trigger the non-codebook based precoded S-CSI-RS.

In a fifth aspect, alone or in combination with one or more of the first through fourth aspects, process 700 includes activating a timer in connection with transmitting the indication associated with triggering the non-codebook based precoded S-CSI-RS, and the timer runs until the non-codebook based precoded S-CSI-RS is received or a duration associated with the timer expires.

In a sixth aspect, alone or in combination with one or more of the first through fifth aspects, transmitting the non-codebook based CSI report MAC-CE includes transmitting the non-codebook based CSI report MAC-CE based at least in part on a determination that the non-codebook based precoded S-CSI-RS is received before the duration associated with the timer expires.

In a seventh aspect, alone or in combination with one or more of the first through sixth aspects, process 700 includes activating a timer in connection with receiving the non-codebook based precoded S-CSI-RS, and the timer runs until the non-codebook based CSI report MAC-CE is transmitted or a duration associated with the timer expires.

In an eighth aspect, alone or in combination with one or more of the first through seventh aspects, transmitting the non-codebook based CSI report MAC-CE includes transmitting the non-codebook based CSI report MAC-CE before the duration associated with the timer expires.

In a ninth aspect, alone or in combination with one or more of the first through eighth aspects, transmitting the non-codebook based CSI report MAC-CE includes transmitting the non-codebook based CSI report MAC-CE without data in a buffer of the UE.

In a tenth aspect, alone or in combination with one or more of the first through ninth aspects, process 700 includes activating a timer in connection with transmitting the indication associated with triggering the non-codebook based precoded S-CSI-RS, and the UE is prevented from transmitting another indication associated with triggering the non-codebook based precoded S-CSI-RS to the other UE until a duration associated with the timer expires.

In an eleventh aspect, alone or in combination with one or more of the first through tenth aspects, the non-codebook based CSI report MAC-CE indicates precoder indexes for one or more precoders associated with the one or more selected precoding beams.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
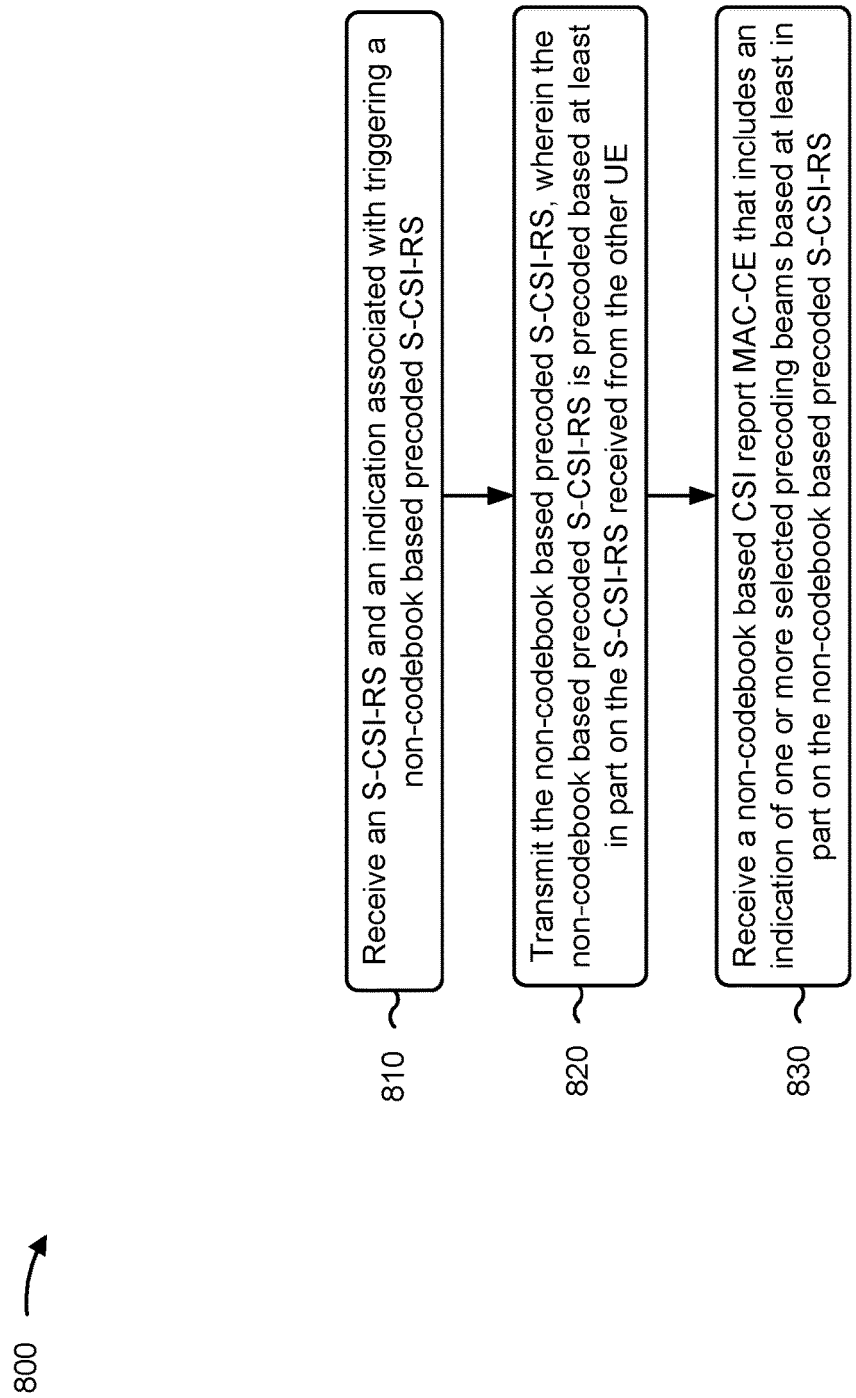

FIG. 8 is a diagram illustrating an example process 800 performed, for example, by a UE, in accordance with the present disclosure. Example process 800 is an example where the UE (e.g., UE 120) performs operations associated with non-codebook based precoding for sidelink communications.

As shown in FIG. 8, in some aspects, process 800 may include receiving, from another UE, an S-CSI-RS and an indication associated with triggering a non-codebook based precoded S-CSI-RS (block 810). For example, the UE (e.g., using communication manager 140 and/or reception component 902, depicted in FIG. 9) may receive, from another UE, an S-CSI-RS and an indication associated with triggering a non-codebook based precoded S-CSI-RS, as described above.

As further shown in FIG. 8, in some aspects, process 800 may include transmitting, to the other UE, the non-codebook based precoded S-CSI-RS, wherein the non-codebook based precoded S-CSI-RS is precoded based at least in part on the S-CSI-RS received from the other UE (block 820). For example, the UE (e.g., using communication manager 140 and/or transmission component 904, depicted in FIG. 9) may transmit, to the other UE, the non-codebook based precoded S-CSI-RS, wherein the non-codebook based precoded S-CSI-RS is precoded based at least in part on the S-CSI-RS received from the other UE, as described above.

As further shown in FIG. 8, in some aspects, process 800 may include receiving, from the other UE, a non-codebook based CSI report MAC-CE that includes an indication of one or more selected precoding beams based at least in part on the non-codebook based precoded S-CSI-RS (block 830). For example, the UE (e.g., using communication manager 140 and/or reception component 902, depicted in FIG. 9) may receive, from the other UE, a non-codebook based CSI report MAC-CE that includes an indication of one or more selected precoding beams based at least in part on the non-codebook based precoded S-CSI-RS, as described above.

Process 800 may include additional aspects, such as any single aspect or any combination of aspects described below and/or in connection with one or more other processes described elsewhere herein.

In a first aspect, process 800 includes transmitting, to the other UE, a sidelink communication using at least one of the one or more selected precoding beams.

In a second aspect, alone or in combination with the first aspect, process 800 includes performing channel estimation based at least in part on the S-CSI-RS received from the other UE, and calculating one or more precoders for precoding the precoded S-CSI-RS based at least in part on the channel estimation.

In a third aspect, alone or in combination with one or more of the first and second aspects, the indication is included in stage two sidelink control information.

In a fourth aspect, alone or in combination with one or more of the first through third aspects, the indication is included, in the stage two sidelink control information, in a bit associated with triggering the non-codebook based precoded S-CSI-RS.

In a fifth aspect, alone or in combination with one or more of the first through fourth aspects, the indication is included, in the stage two sidelink control information, in a bit associated with a CSI request in a time interval during which the bit associated with the CSI request is used to trigger the non-codebook based precoded S-CSI-RS.

In a sixth aspect, alone or in combination with one or more of the first through fifth aspects, process 800 includes activating a timer in connection with receiving the indication associated with triggering the non-codebook based precoded S-CSI-RS, and the timer runs until the non-codebook based precoded S-CSI-RS is transmitted or a duration associated with the timer expires.

In a seventh aspect, alone or in combination with one or more of the first through sixth aspects, transmitting the non-codebook based precoded S-CSI-RS includes transmitting the non-codebook based precoded S-CSI-RS before the duration associated with the timer expires.

In an eighth aspect, alone or in combination with one or more of the first through seventh aspects, transmitting the non-codebook based precoded S-CSI-RS includes transmitting the non-codebook based precoded S-CSI-RS without data in a buffer of the UE.

In a ninth aspect, alone or in combination with one or more of the first through eighth aspects, the non-codebook based CSI report MAC-CE indicates precoder indexes for one or more precoders associated with the one or more selected precoding beams.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
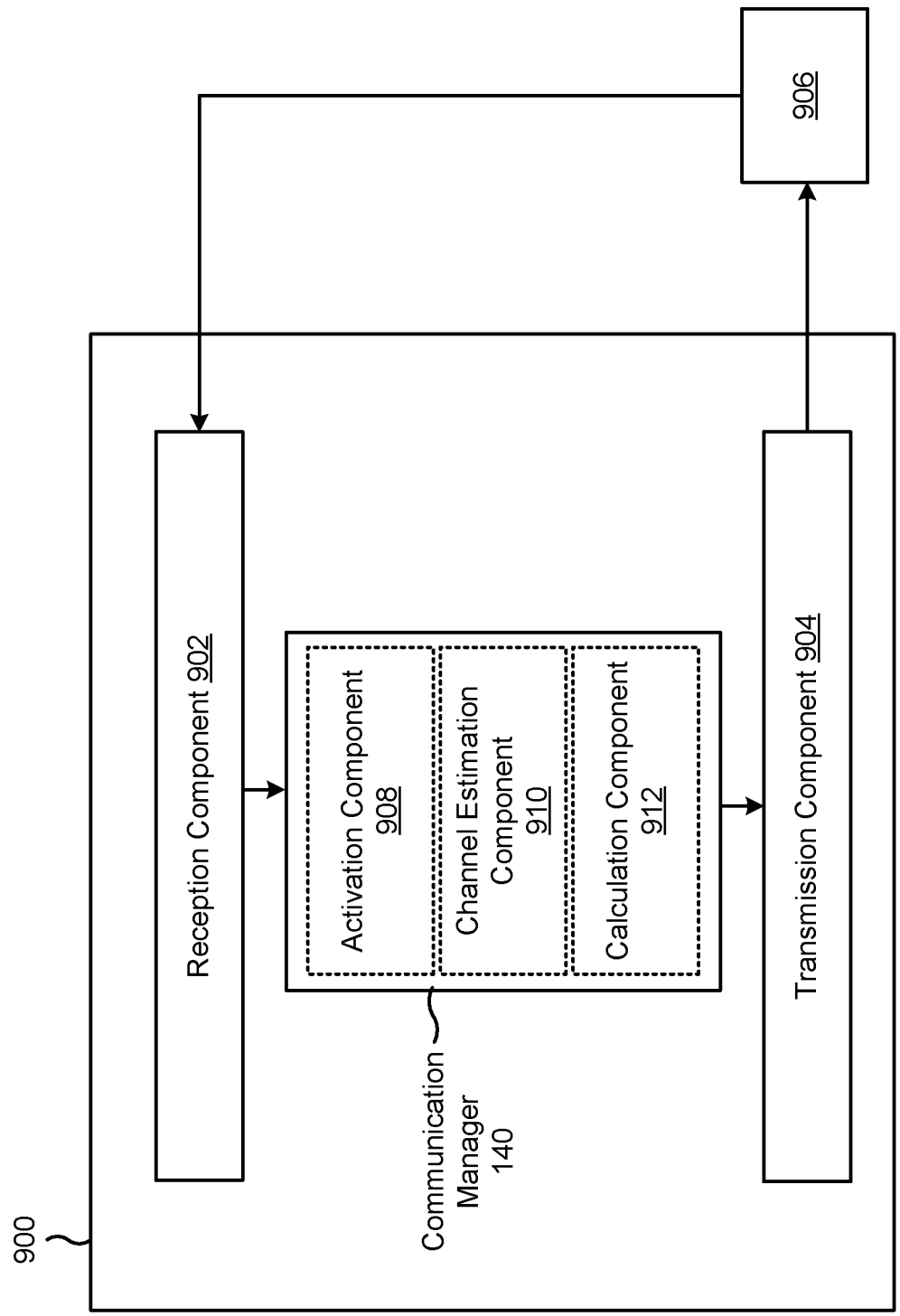
FIG. 9 is a diagram of an example apparatus for wireless communication, in accordance with the present disclosure.

FIG. 9 is a diagram of an example apparatus 900 for wireless communication. The apparatus 900 may be a UE, or a UE may include the apparatus 900. In some aspects, the apparatus 900 includes a reception component 902 and a transmission component 904, which may be in communication with one another (for example, via one or more buses and/or one or more other components). As shown, the apparatus 900 may communicate with another apparatus 906 (such as a UE, a base station, or another wireless communication device) using the reception component 902 and the transmission component 904. As further shown, the apparatus 900 may include the communication manager 140. The communication manager 140 may include one or more of an activation component 908, a channel estimation component 910, or a calculation component 912, among other examples.

In some aspects, the apparatus 900 may be configured to perform one or more operations described herein in connection with FIG. 6. Additionally, or alternatively, the apparatus 900 may be configured to perform one or more processes described herein, such as process 700 of FIG. 7, process 800 of FIG. 8, or a combination thereof. In some aspects, the apparatus 900 and/or one or more components shown in FIG. 9 may include one or more components of the UE described in connection with FIG. 2. Additionally, or alternatively, one or more components shown in FIG. 9 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 902 may receive communications, such as reference signals, control information, data communications, or a combination thereof, from the apparatus 906. The reception component 902 may provide received communications to one or more other components of the apparatus 900. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 906. In some aspects, the reception component 902 may include one or more antennas, a modem, a demodulator, a MIMO detector, a receive processor, a controller/processor, a memory, or a combination thereof, of the UE described in connection with FIG. 2.

The transmission component 904 may transmit communications, such as reference signals, control information, data communications, or a combination thereof, to the apparatus 906. In some aspects, one or more other components of the apparatus 906 may generate communications and may provide the generated communications to the transmission component 904 for transmission to the apparatus 906. In some aspects, the transmission component 904 may perform signal processing on the generated communications (such as filtering, amplification, modulation, digital-to-analog conversion, multiplexing, interleaving, mapping, or encoding, among other examples), and may transmit the processed signals to the apparatus 906. In some aspects, the transmission component 904 may include one or more antennas, a modem, a modulator, a transmit MIMO processor, a transmit processor, a controller/processor, a memory, or a combination thereof, of the UE described in connection with FIG. 2. In some aspects, the transmission component 904 may be co-located with the reception component 902 in a transceiver.

The transmission component 904 may transmit, to another UE, an S-CSI-RS and an indication associated with triggering a non-codebook based precoded S-CSI-RS. The reception component 902 may receive, from the other UE, the non-codebook based precoded S-CSI-RS. The transmission component 904 may transmit, to the other UE, a non-codebook based CSI report MAC-CE that includes an indication of one or more selected precoding beams based at least in part on the non-codebook based precoded S-CSI-RS.

The reception component 902 may receive, from the other UE, a sidelink communication transmitted using at least one of the one or more selected precoding beams.

The activation component 908 may activate a timer in connection with transmitting the indication associated with triggering the non-codebook based precoded S-CSI-RS, wherein the timer runs until the non-codebook based precoded S-CSI-RS is received or a duration associated with the timer expires.

The activation component 908 may activate a timer in connection with receiving the non-codebook based precoded S-CSI-RS, wherein the timer runs until the non-codebook based CSI report MAC-CE is transmitted or a duration associated with the timer expires.

The activation component 908 may activate a timer in connection with transmitting the indication associated with triggering the non-codebook based precoded S-CSI-RS, wherein the UE is prevented from transmitting another indication associated with triggering the non-codebook based precoded S-CSI-RS to the other UE until a duration associated with the timer expires.

The reception component 902 may receive, from another UE, an S-CSI-RS and an indication associated with triggering a non-codebook based precoded S-CSI-RS. The transmission component 904 may transmit, to the other UE, the non-codebook based precoded S-CSI-RS, wherein the non-codebook based precoded S-CSI-RS is precoded based at least in part on the S-CSI-RS received from the other UE. The reception component 902 may receive, from the other UE, a non-codebook based CSI report MAC-CE that includes an indication of one or more selected precoding beams based at least in part on the non-codebook based precoded S-CSI-RS.

The transmission component 904 may transmit, to the other UE, a sidelink communication using at least one of the one or more selected precoding beams.

The channel estimation component 910 may perform channel estimation based at least in part on the S-CSI-RS received from the other UE.

The calculation component 912 may calculate one or more precoders for precoding the precoded S-CSI-RS based at least in part on the channel estimation.

The activation component 908 may activate a timer in connection with receiving the indication associated with triggering the non-codebook based precoded S-CSI-RS, wherein the timer runs until the non-codebook based precoded S-CSI-RS is transmitted or a duration associated with the timer expires.

The number and arrangement of components shown in FIG. 9 are provided as an example. In practice, there may be additional components, fewer components, different components, or differently arranged components than those shown in FIG. 9.

Furthermore, two or more components shown in FIG. 9 may be implemented within a single component, or a single component shown in FIG. 9 may be implemented as multiple, distributed components. Additionally, or alternatively, a set of (one or more) components shown in FIG. 9 may perform one or more functions described as being performed by another set of components shown in FIG. 9.

The following provides an overview of some Aspects of the present disclosure:

Aspect 1: A method of wireless communication performed by a user equipment (UE), comprising: transmitting, to another UE, a sidelink channel state information reference signal (S-CSI-RS) and an indication associated with triggering a non-codebook based precoded S-CSI-RS; receiving, from the other UE, the non-codebook based precoded S-CSI-RS; and transmitting, to the other UE, a non-codebook based channel state information (CSI) report medium access control (MAC) control element (MAC-CE) that includes an indication of one or more selected precoding beams based at least in part on the non-codebook based precoded S-CSI-RS.

Aspect 2: The method of Aspect 1, further comprising: receiving, from the other UE, a sidelink communication transmitted using at least one of the one or more selected precoding beams.

Aspect 3: The method of any of Aspects 1-2, wherein the indication is included in stage two sidelink control information.

Aspect 4: The method of Aspect 3, wherein the indication is included, in the stage two sidelink control information, in a bit associated with triggering the non-codebook based precoded S-CSI-RS.

Aspect 5: The method of Aspect 3, wherein the indication is included, in the stage two sidelink control information, in a bit associated with a CSI request in a time interval during which the bit associated with the CSI request is used to trigger the non-codebook based precoded S-CSI-RS.

Aspect 6: The method of any of Aspects 1-5, further comprising: activating a timer in connection with transmitting the indication associated with triggering the non-codebook based precoded S-CSI-RS, wherein the timer runs until the non-codebook based precoded S-CSI-RS is received or a duration associated with the timer expires.

Aspect 7: The method of Aspect 6, wherein transmitting the non-codebook based CSI report MAC-CE comprises: transmitting the non-codebook based CSI report MAC-CE based at least in part on a determination that the non-codebook based precoded S-CSI-RS is received before the duration associated with the timer expires.

Aspect 8: The method of any of Aspects 1-7, further comprising: activating a timer in connection with receiving the non-codebook based precoded S-CSI-RS, wherein the timer runs until the non-codebook based CSI report MAC-CE is transmitted or a duration associated with the timer expires.

Aspect 9: The method of Aspect 8, wherein transmitting the non-codebook based CSI report MAC-CE comprises: transmitting the non-codebook based CSI report MAC-CE before the duration associated with the timer expires.

Aspect 10: The method of any of Aspects 1-9, wherein transmitting the non-codebook based CSI report MAC-CE comprises: transmitting the non-codebook based CSI report MAC-CE without data in a buffer of the UE.

Aspect 11: The method of any of Aspects 1-10, further comprising: activating a timer in connection with transmitting the indication associated with triggering the non-codebook based precoded S-CSI-RS, wherein the UE is prevented from transmitting another indication associated with triggering the non-codebook based precoded S-CSI-RS to the other UE until a duration associated with the timer expires.

Aspect 12: The method of any of Aspects 1-11, wherein the non-codebook based CSI report MAC-CE indicates precoder indexes for one or more precoders associated with the one or more selected precoding beams.

Aspect 13: A method of wireless communication performed by a user equipment (UE), comprising: receiving, from another UE, a sidelink channel state information reference signal (S-CSI-RS) and an indication associated with triggering a non-codebook based precoded S-CSI-RS; transmitting, to the other UE, the non-codebook based precoded S-CSI-RS, wherein the non-codebook based precoded S-CSI-RS is precoded based at least in part on the S-CSI-RS received from the other UE; and receiving, from the other UE, a non-codebook based channel state information (CSI) report medium access control (MAC) control element (MAC-CE) that includes an indication of one or more selected precoding beams based at least in part on the non-codebook based precoded S-CSI-RS.

Aspect 14: The method of Aspect 13, further comprising: transmitting, to the other UE, a sidelink communication using at least one of the one or more selected precoding beams.

Aspect 15: The method of any of Aspects 13-14, further comprising: performing channel estimation based at least in part on the S-CSI-RS received from the other UE; and calculating one or more precoders for precoding the precoded S-CSI-RS based at least in part on the channel estimation.

Aspect 16: The method of any of Aspects 13-15, wherein the indication is included in stage two sidelink control information.

Aspect 17: The method of Aspect 16, wherein the indication is included, in the stage two sidelink control information, in a bit associated with triggering the non-codebook based precoded S-CSI-RS.

Aspect 18: The method of Aspect 16, wherein the indication is included, in the stage two sidelink control information, in a bit associated with a CSI request in a time interval during which the bit associated with the CSI request is used to trigger the non-codebook based precoded S-CSI-RS.

Aspect 19: The method of any of Aspects 13-18, further comprising: activating a timer in connection with receiving the indication associated with triggering the non-codebook based precoded S-CSI-RS, wherein the timer runs until the non-codebook based precoded S-CSI-RS is transmitted or a duration associated with the timer expires.

Aspect 20: The method of Aspect 19, wherein transmitting the non-codebook based precoded S-CSI-RS comprises: transmitting the non-codebook based precoded S-CSI-RS before the duration associated with the timer expires.

Aspect 21: The method of any of Aspects 13-20, wherein transmitting the non-codebook based precoded S-CSI-RS comprises: transmitting the non-codebook based precoded S-CSI-RS without data in a buffer of the UE.

Aspect 22: The method of any of Aspects 13-21, wherein the non-codebook based CSI report MAC-CE indicates precoder indexes for one or more precoders associated with the one or more selected precoding beams.

Aspect 23: An apparatus for wireless communication at a device, comprising a processor; memory coupled with the processor; and instructions stored in the memory and executable by the processor to cause the apparatus to perform the method of one or more of Aspects 1-12.

Aspect 24: An apparatus for wireless communication at a device, comprising a processor; memory coupled with the processor; and instructions stored in the memory and executable by the processor to cause the apparatus to perform the method of one or more of Aspects 13-22.

Aspect 25: A device for wireless communication, comprising a memory and one or more processors coupled to the memory, the one or more processors configured to perform the method of one or more of Aspects 1-12.

Aspect 26: A device for wireless communication, comprising a memory and one or more processors coupled to the memory, the one or more processors configured to perform the method of one or more of Aspects 13-22.

Aspect 27: An apparatus for wireless communication, comprising at least one means for performing the method of one or more of Aspects 1-12.

Aspect 28: An apparatus for wireless communication, comprising at least one means for performing the method of one or more of Aspects 13-22.

Aspect 29: A non-transitory computer-readable medium storing code for wireless communication, the code comprising instructions executable by a processor to perform the method of one or more of Aspects 1-12.

Aspect 30: A non-transitory computer-readable medium storing code for wireless communication, the code comprising instructions executable by a processor to perform the method of one or more of Aspects 13-22.

Aspect 31: A non-transitory computer-readable medium storing a set of instructions for wireless communication, the set of instructions comprising one or more instructions that, when executed by one or more processors of a device, cause the device to perform the method of one or more of Aspects 1-12.

Aspect 32: A non-transitory computer-readable medium storing a set of instructions for wireless communication, the set of instructions comprising one or more instructions that, when executed by one or more processors of a device, cause the device to perform the method of one or more of Aspects 13-22.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:
   one or more memories; and
   one or more processors, coupled to the one or more memories, configured to:
     transmit, to another UE, a sidelink channel state information reference signal (S-CSI-RS) and a trigger for a non-codebook based precoded S-CSI-RS;
     receive, from the other UE, the non-codebook based precoded S-CSI-RS; and
     transmit, to the other UE, a non-codebook based channel state information (CSI) report medium access control (MAC) control element (MAC-CE) that includes an indication of one or more selected precoding beams based at least in part on the non-codebook based precoded S-CSI-RS.

2. The UE of claim 1, wherein the one or more processors are further configured to:
   receive, from the other UE, a sidelink communication transmitted using at least one of the one or more selected precoding beams.

3. The UE of claim 1, wherein the trigger is an indication included in stage two sidelink control information.

4. The UE of claim 3, wherein the indication for the trigger is included, in the stage two sidelink control information, in a bit associated with triggering the non-codebook based precoded S-CSI-RS.

5. The UE of claim 3, wherein the indication for the trigger is included, in the stage two sidelink control information, in a bit associated with a CSI request in a time interval during which the bit associated with the CSI request is used to trigger the non-codebook based precoded S-CSI-RS.

6. The UE of claim 1, wherein the one or more processors are further configured to:
   activate a timer in connection with transmitting the trigger, wherein the timer runs until the non-codebook based precoded S-CSI-RS is received or a duration associated with the timer expires.

7. The UE of claim 6, wherein the one or more processors, to transmit the non-codebook based CSI report MAC-CE, are configured to:
   transmit the non-codebook based CSI report MAC-CE based at least in part on a determination that the non-codebook based precoded S-CSI-RS is received before the duration associated with the timer expires.

8. The UE of claim 1, wherein the one or more processors are further configured to:
   activate a timer in connection with receiving the non-codebook based precoded S-CSI-RS, wherein the timer runs until the non-codebook based CSI report MAC-CE is transmitted or a duration associated with the timer expires.

9. The UE of claim 8, wherein the one or more processors, to transmit the non-codebook based CSI report MAC-CE, are configured to:
   transmit the non-codebook based CSI report MAC-CE before the duration associated with the timer expires.

10. The UE of claim 1, wherein the one or more processors, to transmit the non-codebook based CSI report MAC-CE, are configured to:
    transmit the non-codebook based CSI report MAC-CE without data in a buffer of the UE.

11. The UE of claim 1, wherein the one or more processors are further configured to:
    activate a timer in connection with transmitting the trigger; and
    prevent from transmission of another trigger to the other UE until a duration associated with the timer expires.

12. The UE of claim 1, wherein the non-codebook based CSI report MAC-CE indicates precoder indexes for one or more precoders associated with the one or more selected precoding beams.

13. A user equipment (UE) for wireless communication, comprising:
    one or more memories; and
    one or more processors, coupled to the one or more memories, configured to:
      receive, from another UE, a sidelink channel state information reference signal (S-CSI-RS) and a trigger for a non-codebook based precoded S-CSI-RS;
      transmit, to the other UE, the non-codebook based precoded S-CSI-RS, wherein the non-codebook based precoded S-CSI-RS is precoded based at least in part on the S-CSI-RS received from the other UE; and
      receive, from the other UE, a non-codebook based channel state information (CSI) report medium access control (MAC) control element (MAC-CE) that includes an indication of one or more selected precoding beams based at least in part on the non-codebook based precoded S-CSI-RS.

14. The UE of claim 13, wherein the one or more processors are further configured to:

transmit, to the other UE, a sidelink communication using at least one of the one or more selected precoding beams.

15. The UE of claim 13, wherein the one or more processors are further configured to:
perform channel estimation based at least in part on the S-CSI-RS received from the other UE; and
calculate one or more precoders for precoding the precoded S-CSI-RS based at least in part on the channel estimation.

16. The UE of claim 13, wherein the trigger is an indication included in stage two sidelink control information.

17. The UE of claim 16, wherein the indication for the trigger is included, in the stage two sidelink control information, in a bit associated with triggering the non-codebook based precoded S-CSI-RS.

18. The UE of claim 16, wherein the indication for the trigger is included, in the stage two sidelink control information, in a bit associated with a CSI request in a time interval during which the bit associated with the CSI request is used to trigger the non-codebook based precoded S-CSI-RS.

19. The UE of claim 13, wherein the one or more processors are further configured to:
activate a timer in connection with receiving the trigger, wherein the timer runs until the non-codebook based precoded S-CSI-RS is transmitted or a duration associated with the timer expires.

20. The UE of claim 19, wherein the one or more processors, to transmit the non-codebook based precoded S-CSI-RS, are configured to:
transmit the non-codebook based precoded S-CSI-RS before the duration associated with the timer expires.

21. The UE of claim 13, wherein the one or more processors, to transmit the non-codebook based precoded S-CSI-RS, are configured to:
transmit the non-codebook based precoded S-CSI-RS without data in a buffer of the UE.

22. The UE of claim 13, wherein the non-codebook based CSI report MAC-CE indicates precoder indexes for one or more precoders associated with the one or more selected precoding beams.

23. A method of wireless communication performed by a user equipment (UE), comprising:
transmitting, to another UE, a sidelink channel state information reference signal (S-CSI-RS) and a trigger for a non-codebook based precoded S-CSI-RS;
receiving, from the other UE, the non-codebook based precoded S-CSI-RS; and
transmitting, to the other UE, a non-codebook based channel state information (CSI) report medium access control (MAC) control element (MAC-CE) that includes an indication of one or more selected precoding beams based at least in part on the non-codebook based precoded S-CSI-RS.

24. The method of claim 23, further comprising:
receiving, from the other UE, a sidelink communication transmitted using at least one of the one or more selected precoding beams.

25. The method of claim 23, further comprising:
activating a timer in connection with transmitting the trigger, wherein the timer runs until the non-codebook based precoded S-CSI-RS is received or a duration associated with the timer expires.

26. The method of claim 23, further comprising:
activating a timer in connection with receiving the non-codebook based precoded S-CSI-RS, wherein the timer runs until the non-codebook based CSI report MAC-CE is transmitted or a duration associated with the timer expires.

27. A method of wireless communication performed by a user equipment (UE), comprising:
receiving, from another UE, a sidelink channel state information reference signal (S-CSI-RS) and a trigger for a non-codebook based precoded S-CSI-RS;
transmitting, to the other UE, the non-codebook based precoded S-CSI-RS, wherein the non-codebook based precoded S-CSI-RS is precoded based at least in part on the S-CSI-RS received from the other UE; and
receiving, from the other UE, a non-codebook based channel state information (CSI) report medium access control (MAC) control element (MAC-CE) that includes an indication of one or more selected precoding beams based at least in part on the non-codebook based precoded S-CSI-RS.

28. The method of claim 27, further comprising:
transmitting, to the other UE, a sidelink communication using at least one of the one or more selected precoding beams.

29. The method of claim 27, further comprising:
performing channel estimation based at least in part on the S-CSI-RS received from the other UE; and
calculating one or more precoders for precoding the precoded S-CSI-RS based at least in part on the channel estimation.

30. The method of claim 27, further comprising:
activating a timer in connection with receiving the trigger, wherein the timer runs until the non-codebook based precoded S-CSI-RS is transmitted or a duration associated with the timer expires.

* * * * *